United States Patent
Lavery et al.

(10) Patent No.: US 11,520,972 B2
(45) Date of Patent: Dec. 6, 2022

(54) FUTURE POTENTIAL NATURAL LANGUAGE PROCESSING ANNOTATIONS

(71) Applicant: International Business Machines Corporation, Armonk, NY (US)

(72) Inventors: Andrew J Lavery, Austin, TX (US); Scott Carrier, New Hill, NC (US); Paul Joseph Hake, Madison, CT (US); Igor S. Ramos, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 16/984,245

(22) Filed: Aug. 4, 2020

(65) Prior Publication Data

US 2022/0043968 A1  Feb. 10, 2022

(51) Int. Cl.
- G06F 17/00 (2019.01)
- G06F 40/169 (2020.01)
- G06F 40/279 (2020.01)

(52) U.S. Cl.
CPC .......... G06F 40/169 (2020.01); G06F 40/279 (2020.01)

(58) Field of Classification Search
CPC ............................ G06F 40/169; G06F 40/279
USPC ...................................... 715/230, 231; 704/9
See application file for complete search history.

(56) References Cited

U.S. PATENT DOCUMENTS

| | | | |
|---|---|---|---|
| 6,295,542 B1 | 9/2001 | Corbin | |
| 7,379,846 B1 * | 5/2008 | Williams | .............. G06F 11/079 702/183 |
| 8,750,836 B2 | 6/2014 | Woloshyn | |
| 8,832,205 B2 * | 9/2014 | Nelson | ................. G06Q 10/109 709/205 |
| 8,874,434 B2 | 10/2014 | Collobert et al. | |
| 8,887,286 B2 | 11/2014 | Dupont et al. | |
| 9,818,136 B1 * | 11/2017 | Hoffberg | ............ G06Q 30/0282 |
| 10,096,034 B2 * | 10/2018 | Kass | ...................... G06Q 10/04 |

(Continued)

FOREIGN PATENT DOCUMENTS

WO  2017015392 A1  1/2017

OTHER PUBLICATIONS

Katie McConky, Improving Event Co-reference by Context Extraction and Dynamic Feature Weighting, 2012, IEEE International Multi-Disciplinary Conference on Cognitive Methods in Situation Awareness and Decision Support, New Orleans, LA (Year: 2012).*

(Continued)

*Primary Examiner* — Stephen S Hong
*Assistant Examiner* — Matthew J Ludwig
(74) *Attorney, Agent, or Firm* — Cantor Colburn LLP; Kelsey M. Skodje

(57) ABSTRACT

Aspects of the invention include resolving future reference identifiers for documents. Aspects of the invention include processing a document including a reference to a future event, wherein processing includes performing natural language processing (NLP) on the document, and identifying the reference to the future event included in the document. Aspects of the invention also include generating a future reference identifier for the reference to the future event, and responsive to processing an occurrence of the future event, resolving the future reference identifier by providing data from a subsequent document for the future event associated with the future reference identifier.

14 Claims, 6 Drawing Sheets

(56) References Cited

U.S. PATENT DOCUMENTS

| | | | |
|---|---|---|---|
| 10,223,759 B2* | 3/2019 | Naeymi-Rad | G16H 10/60 |
| 10,225,076 B2 | 3/2019 | Leng et al. | |
| 10,291,629 B2* | 5/2019 | Allen | H04L 63/1416 |
| 10,423,633 B2 | 9/2019 | Mirhaji | |
| 10,475,000 B2* | 11/2019 | Sarrazin | G06Q 10/107 |
| 10,896,407 B2* | 1/2021 | Avalos Vega | G06Q 10/1095 |
| 10,970,635 B1* | 4/2021 | Perlin | G16H 50/30 |
| 11,263,391 B2* | 3/2022 | Potts | G16H 15/00 |
| 2008/0052205 A1* | 2/2008 | Dolley | G06Q 10/087 705/28 |
| 2013/0031455 A1 | 1/2013 | Griffiths et al. | |
| 2013/0226926 A1* | 8/2013 | Beaurepaire | G06K 9/00704 707/740 |
| 2014/0006424 A1* | 1/2014 | Al-Kofahi | G06F 40/169 707/754 |
| 2015/0234810 A1 | 8/2015 | Bostick et al. | |
| 2015/0242384 A1 | 8/2015 | Reiter | |
| 2016/0078102 A1 | 3/2016 | Crouch et al. | |
| 2016/0110433 A1 | 4/2016 | Sawhney et al. | |
| 2016/0147955 A1* | 5/2016 | Shah | G16H 40/20 705/3 |
| 2016/0239737 A1 | 8/2016 | Jiang et al. | |
| 2016/0283460 A1 | 9/2016 | Weald et al. | |
| 2016/0357861 A1* | 12/2016 | Carlhian | G06F 16/36 |
| 2017/0046661 A1 | 2/2017 | Spear et al. | |
| 2017/0132371 A1* | 5/2017 | Amarasingham | G06F 40/284 |
| 2017/0262614 A1* | 9/2017 | Vishnubhatla | G06Q 40/08 |
| 2018/0101598 A1* | 4/2018 | Allen | G06F 40/242 |
| 2018/0191860 A1 | 7/2018 | Ghafourifar et al. | |
| 2018/0300315 A1 | 10/2018 | Leal et al. | |
| 2018/0336183 A1 | 11/2018 | Lee et al. | |
| 2019/0034589 A1* | 1/2019 | Chen | G06N 3/0454 |
| 2019/0188552 A1* | 6/2019 | Andersen | G10L 15/1815 |
| 2020/0019893 A1* | 1/2020 | Lu | G06N 5/025 |
| 2020/0267235 A1 | 8/2020 | Hampson et al. | |
| 2020/0293712 A1* | 9/2020 | Potts | G16H 10/60 |
| 2020/0294640 A1* | 9/2020 | Ginsburg | G16H 40/20 |
| 2020/0381087 A1* | 12/2020 | Ozeran | G16H 10/60 |
| 2020/0401960 A1* | 12/2020 | Vangala | G06F 3/0483 |
| 2020/0410050 A1* | 12/2020 | Cason | G06N 20/00 |
| 2021/0004770 A1* | 1/2021 | Bansal | |
| 2021/0090694 A1* | 3/2021 | Colley | G16B 40/00 |
| 2021/0192408 A1* | 6/2021 | Lundberg | G06F 40/56 |
| 2022/0012073 A1* | 1/2022 | Granot | H04L 67/10 |
| 2022/0044812 A1* | 2/2022 | Barnes | G16H 10/60 |

OTHER PUBLICATIONS

Dutta, 'An Electronic Tool for Improved communication of radiographic incidental finding to discharged emergency department patients', Oct. 2011, Annals of Emergency Medicine, supp..1 58.4:S309-S310 (Year: 2011).*
Chen, A Parallel Patient Treatment Time Prediction Algorithm and Its Applications in Hospital Queing—Recommendation in a Big Data Environment, IEEE Acess, vol. 4, 2016 (Year: 2016).*
Tao, Prescription Extraction Using CRFs and word embeddings, Journal of Biomedical Informatics, 2017 (Year: 2017).*
Anonymous, "A decentralized invitation mechanism for protected document distribution whilst retaining persistent encryption/document control", IP.com No. IPCOM000218789D, Publication Date: Jun. 2012, 6 pages.
Anonymous, "Datastructure for defining a device's interface and functionality in an M2M environment and Mechanism for verifying a device's functionality in an M2M environment", IP.com No. IPCOM000234906D, Publication Date: Feb. 2014, 17 pages.
Anonymous, "System and Method to create a pre-required environment for an user to perform an identified task within an electronic document", IP.com No. IPCOM000248151D, Publication Date: Nov. 2016, 3 pages.
Computer Security Resource Center, "Cloud Computing," URL: http://csrc.nist.gov/groups/SNS/cloud-computing/index.html; Retrieved: Aug. 3, 2020; 4 pages.
Jang-Jaccard,"Building Reliable and Robust Service-Based Systems for Automated Business Processes", School of Information Technologies, University of Sydney, Mar. 2007, 177 pages.
Lavery et al., "Promised Natural Language Processing Annotations" U.S. Appl. No. 16/984,234, filed Aug. 4, 2020.
List of IBM Patents or Patent Applications Treated as Related (Appendix P); Date Filed: Aug. 4, 2020; 2 pages.
Schafer, "A Programming Model and Language for Concurrent and Distributed Object-Oriented Systems", Dissertation, Nov. 2010, 242 pages.

* cited by examiner

FUTURE POTENTIAL NATURAL LANGUAGE PROCESSING ANNOTATIONS

BACKGROUND

The present invention generally relates to natural language processing, and more specifically, to generating future potential natural language processing (NLP) annotations.

Natural language processing is a field of computer science, artificial intelligence, and linguistics concerned with the interactions between computers and human (natural) languages. As such, NLP is often involved with natural language understanding, i.e. enabling computers to derive meaning from human or natural language input, and natural language generation.

NLP mechanisms generally perform one or more types of lexical or dependency parsing analysis including morphological analysis, syntactical analysis or parsing, semantic analysis, pragmatic analysis, or other types of analysis directed to understanding textual content. In morphological analysis, the NLP mechanisms analyze individual words and punctuation to determine the part of speech associated with the words. In syntactical analysis or parsing, the NLP mechanisms determine the sentence constituents and the hierarchical sentence structure using word order, number agreement, case agreement, and/or grammar. In semantic analysis, the NLP mechanisms determine the meaning of the sentence from extracted clues within the textual content. With many sentences being ambiguous, the NLP mechanisms may look to the specific actions being performed on specific objects within the textual content. Finally, in pragmatic analysis, the NLP mechanisms determine an actual meaning and intention in context (of a speaker, of a previous sentence, etc.). These are only some aspects of NLP mechanisms. Many different types of NLP mechanisms exist that perform various types of analysis to attempt to convert natural language input into a machine understandable set of data.

Modern NLP algorithms are based on machine learning, especially statistical machine learning. The paradigm of machine learning is different from that of most prior attempts at language processing in prior implementations of language-processing tasks typically involved the direct hand coding of large sets of rules, whereas the machine-learning paradigm calls instead for using general learning algorithms (often, although not always, grounded in statistical inference) to automatically learn such rules through the analysis of large corpora of typical real-world examples. A corpus (plural, "corpora") is a set of documents (or sometimes, individual sentences) that have been hand-annotated with the correct values to be learned.

SUMMARY

Embodiments of the present invention are directed to generating future potential NLP annotations. A non-limiting example computer-implemented method includes processing a document including a reference to a future event, wherein processing includes performing natural language processing (NLP) on the document, and identifying the reference to the future event included in the document. The computer-implemented method also includes generating a future reference identifier for the reference to the future event, and responsive to processing an occurrence of the future event, resolving the future reference identifier by providing data from a subsequent document for the future event associated with the future reference identifier.

Other embodiments of the present invention implement features of the above-described method in computer systems and computer program products for generating future potential NLP annotations.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted, or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention provide an NLP engine and/or a pre-processing engine that is configured to associate a future event in a first span of text using a unique identifier and context. The identifier and context are a promise that may later be resolved when the appropriate event is detected. This enables an end-user application or downstream process to anticipate that more information will be provided in the future. This provides an efficient way for an end-user application or downstream process to find the information using the future reference identifier.

Natural language documents oftentimes have references to future events that have not yet occurred. For example, in the medical field a doctor's note might indicate that a "mole was removed from a patient's forehead and sent to the lab for a biopsy. Results will be available in 2 weeks." Existing NLP solutions do not allow one to see what pending information (e.g., biopsy results) is expected from a document.

Current NLP systems do not link or make associations for completely independent documents that are asynchronously processed based on a reference to a future event. One or more embodiments of the present invention address one or more of the above-described shortcomings of the prior art by providing techniques to associate future appropriate findings in the document with an earlier reference to an event.

Figure 1:
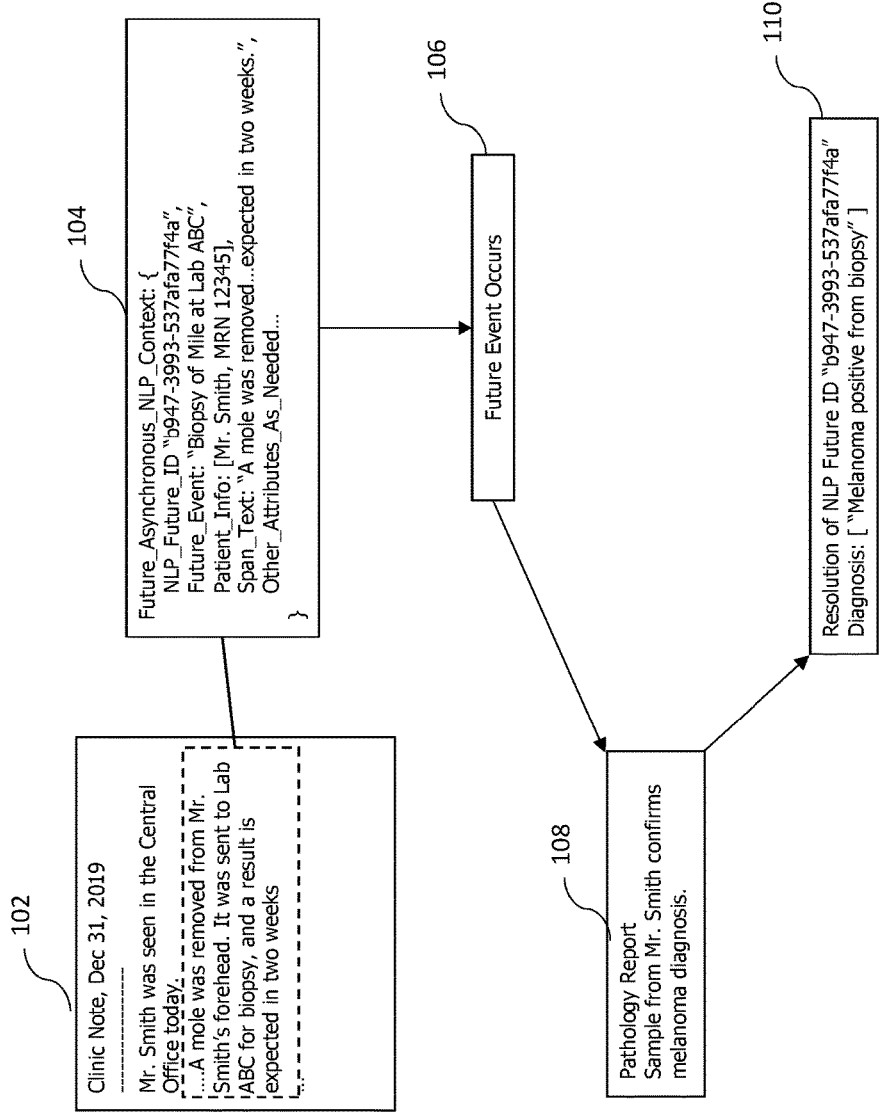
FIG. 1 depicts an example document that is processed using techniques for generating NLP annotations in accordance with one or more embodiments of the present invention.

Turning now to FIG. 1, a framework 100 is generally shown in accordance with one or more embodiments of the present invention. An example document 102 that is processed by the techniques of the invention described herein. The processing of a portion of the document 102 starts an asynchronous process. That is the process may or may not be resolved in the future with a subsequent event. The document 102 includes a plurality of pages related to a patient's information. In this non-limiting example, the text of document 102 is processed by an NLP engine and includes the texted provides "A mole was removed from Mr. Smith's forehead. It was sent to Lab ABC for biopsy, and results are expected in two weeks."

Responsive to the detection, by the NLP engine, that the future event is a biopsy for Mr. Smith, a record (Future NLP Context) 104 is generated and can be stored in a memory of the system. In one or more embodiments of the invention, the future event can include any procedure, test, operation, check-up, etc. that is to occur in the future.

Figure 2:
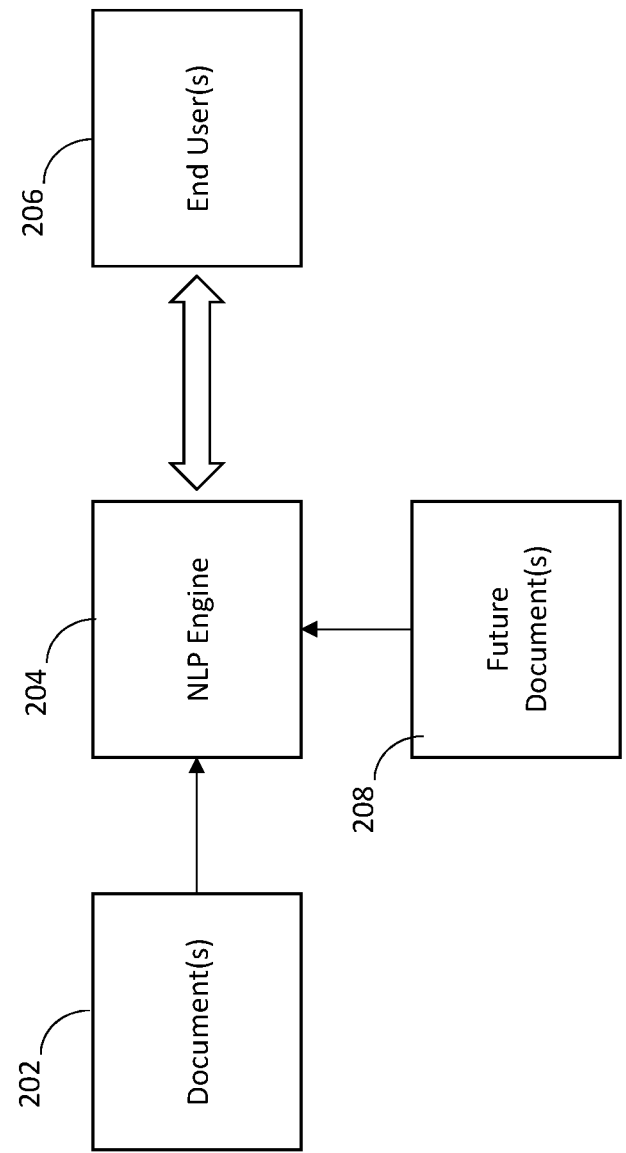
FIG. 2 illustrates a block diagram of a system for generating future NLP annotations in accordance with one or more embodiments of the present invention.

FIG. 1 depicts a block 104 which indicates an example future reference context 104 is generated by the NLP engine 204 (shown in FIG. 2). In this non-limiting example, the future reference context includes a future reference ID; a future event; patient information; span of text; other attributes. It should be understood that additional fields can be added to the future reference context.

In one or more embodiments of the invention, the future reference context is related to a patient and/or scenario. In different embodiments, the NLP system can maintain records of future reference contexts and track when the future event occurs. Upon completion of the future event, the NLP engine can analyze the additional report for the patient and/or scenario and associated the information with the initial future reference context.

In a non-limiting example, the future reference context can also include information in addition to the future context identifier, the Future Event; Patient Info: a Span of Text; Other Attributes; etc. Conventional NLP systems are not configured to associate current information from an initial document with a future event, upon completion of the future event. The updates provided from the future event can provide important insights to the end-user or downstream process.

Regarding the span of text, the document 102 states, " . . . A mole was removed . . . expected in two weeks." Conventional systems are not configured to track and maintain information associated with the future event. The techniques described herein will match the information of the future events with the current document. It should also be understood the future event may or may not occur and therefore, may not be resolved in the future.

The future event at block 106 occurs and a report is generated for the event. In this non-limiting example, the biopsy has been completed. At block 108 the report indicates the "Sample (biopsy) from Mr. Smith confirms melanoma diagnosis" and is provided to the NLP document.

Upon the completion of an event and processing a document for the completed event, the information associated with the completed event can be provided to an end-user or other downstream application. As shown in the final result 110, the resolution of the future reference identifier provides information for the patient.

Responsive to the completion of the future event referenced in the document 102 and a report is input into the NLP engine, the NLP engine can resolve the pending information in the future reference context. In this non-limiting example, the future reference ID "b947-3993-537afa77f4a" is associated with the diagnosis from the report indicating "Melanoma positive from biopsy" as shown at block 110.

Without the feature described above, the end-user is not provided the updated information and content associated with the completed event. The end-user would be required to manually locate the references and obtain the relevant information from another document related to the future event.

FIG. 2 depicts a block diagram of a system 200 in accordance with one or more embodiments of the invention. Embodiments of the invention can receive the documents 202 from various sources such as an upstream process or processor or some other external source (not shown). In one or more embodiments of the invention, an initial document 202 can include one or more references to future events and is provided to an NLP engine 204. The NLP engine 204 is configured to process the document 202 and identify the reference(s) to the future event. For each reference to a future event that occurs in the document 202, the NLP engine 204 can generate a future reference context/identifier and resolve the information upon the occurrence of the future event.

In some examples, the NLP engine 204 can determine the future event by identifying text related to a time period and future activity. Language such as "in two weeks . . . ", "to be determined . . . ", "results expected . . . ", or any variation thereof can be detected by the NLP engine 204. It should be understood that other types of text can be used by the NLP.

During the duration of time between the generation of the future reference context and the occurrence/resolution of the future event, the NLP engine 204 of the system 200 can provide a status such as "Pending" to an end-user 206 or downstream process. In one or more embodiments of the invention, a configurable periodic status can be provided to the end-user 206 or downstream process. Responsive to the occurrence of the future event and inputting the future document 208 associated with the future event into the NLP engine 204, the NLP engine 204 can resolve the information of the initial document 202 by matching the information between the initial document 202 and the future documents 208. The future reference context/identifier and content are provided to the end-user 206 or downstream process.

The NLP engine 204 continues to analyze additional documents and processes information related to the future event that is previously referred to in the document and returns the associated information if available.

Figure 3:
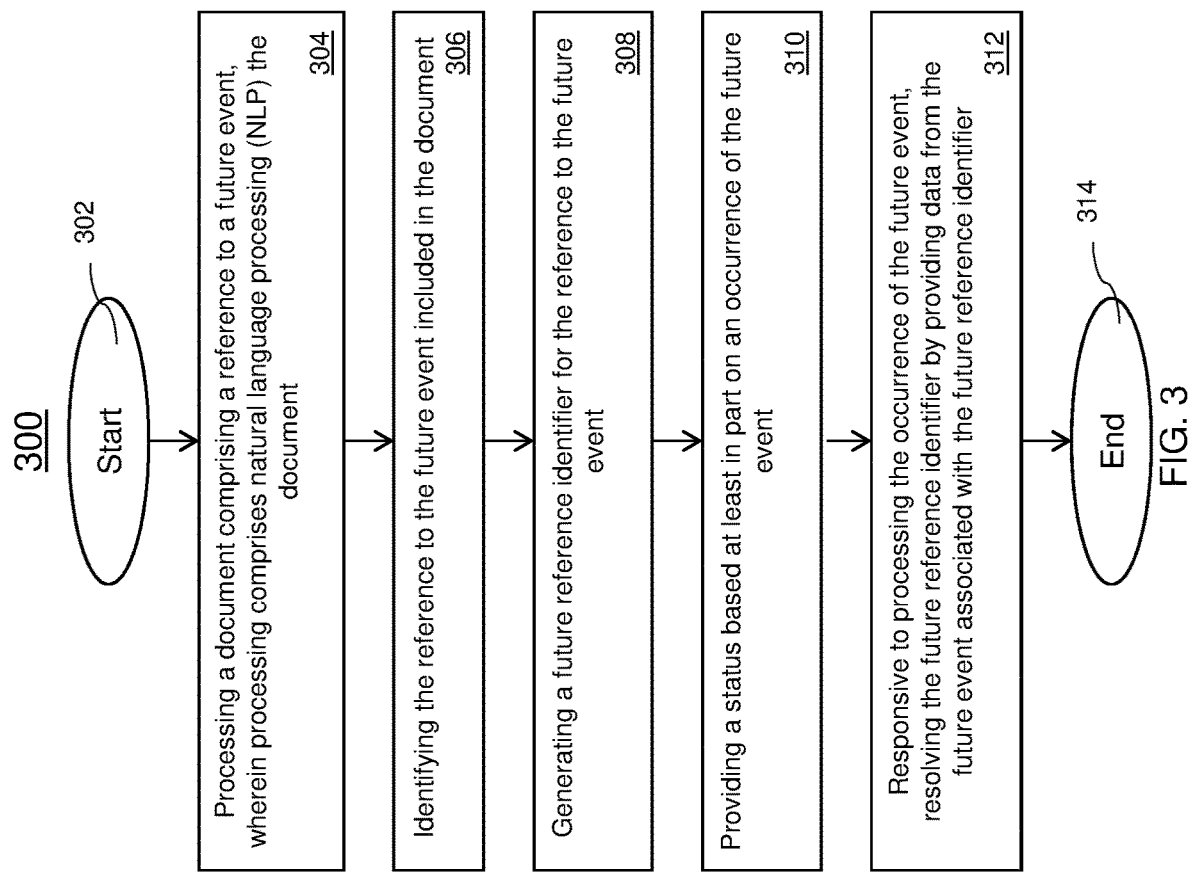
FIG. 3 illustrates a flow diagram of a process for generating future NLP annotations in accordance with one or more embodiments of the present invention.

FIG. 3 depicts a flowchart of a method 300 for resolving a reference to a future event in accordance with one or more embodiments of the invention. The method 300 can be performed by a system 200 such as that shown in FIG. 2. The method 300 begins at block 302 and proceeds to block 304 which provides for processing a document including a reference to a future event, wherein processing includes performing natural language processing (NLP) on the document. Block 306 identifies the reference to the future event included in the document. The NLP engine can be configured to determine a future event based on specific keywords or references to future time periods. It should be understood that various techniques can be used to identify the future event. Block 308 generates a future reference identifier for the reference to the future event. Block 310 provides a status based at least in part on an occurrence of the future event. In one or more embodiments of the invention, if the future event is expected but has not occurred the status can indicate a pending status to the end-user. In the event the future event has occurred, the method 300 proceeds to block 312 which provides responsive to processing an occurrence of the future event, resolving the future reference identifier by providing data from the future event associated with the future reference identifier. For example, as shown in FIG. 1, the future reference identifier (future context identifier) "b947-3993-537afa77f4a" for the future event is matched with the data for the future event "biopsy" that is to occur in the future. This enables an end-user to efficiently obtain data from different documents that are associated with the future event. The method 300 ends at block 314. It should be understood that additional steps or a different sequence of steps can be used and is not intended to be limited by the steps of FIG. 3.

The technical benefits and effects include identifying references to future events presented within a document and resolving the information that is associated with an asynchronously occurring future event. The future event of the natural language document is associated with a unique identifier and context. The techniques provide an efficient technique to find information, if resolved in the future, using the unique identifier.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
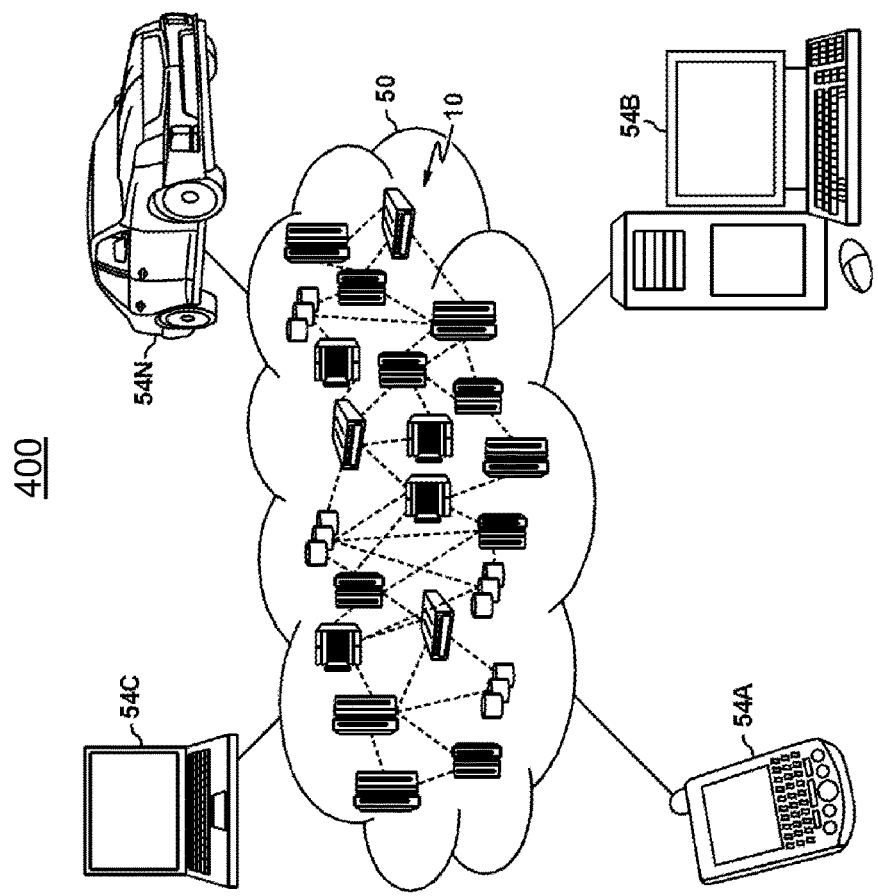
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
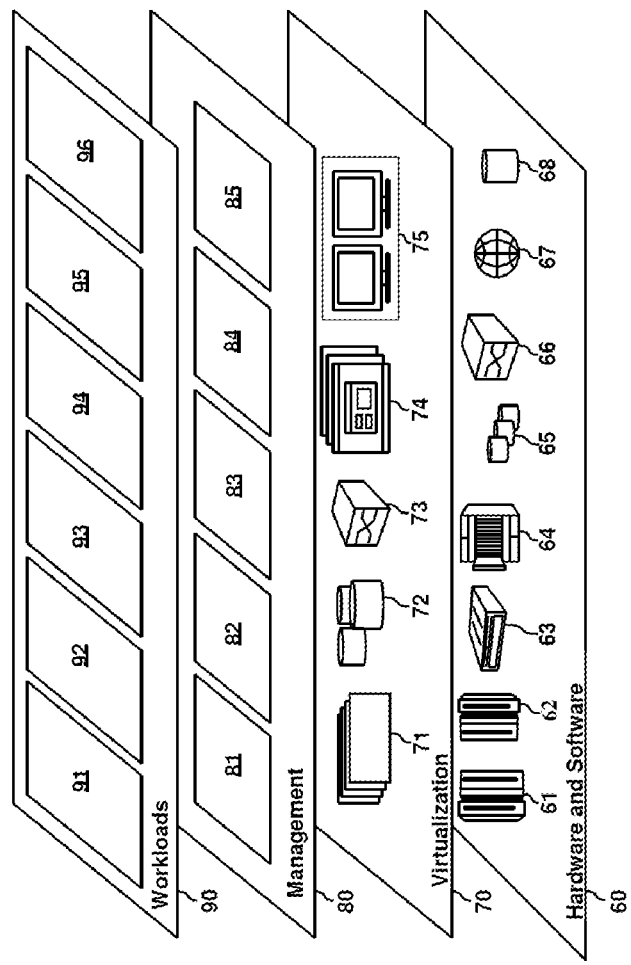
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and NLP 96.

It is understood that one or more embodiments of the present invention are capable of being implemented in conjunction with any other type of computing environment now known or later developed. For example, FIG. 5 depicts a block diagram of a processing system 600 for implementing the techniques described herein. In accordance with one or more embodiments of the present invention, system 600 is an example of a cloud computing node 10 of FIG. 4.

Figure 6:
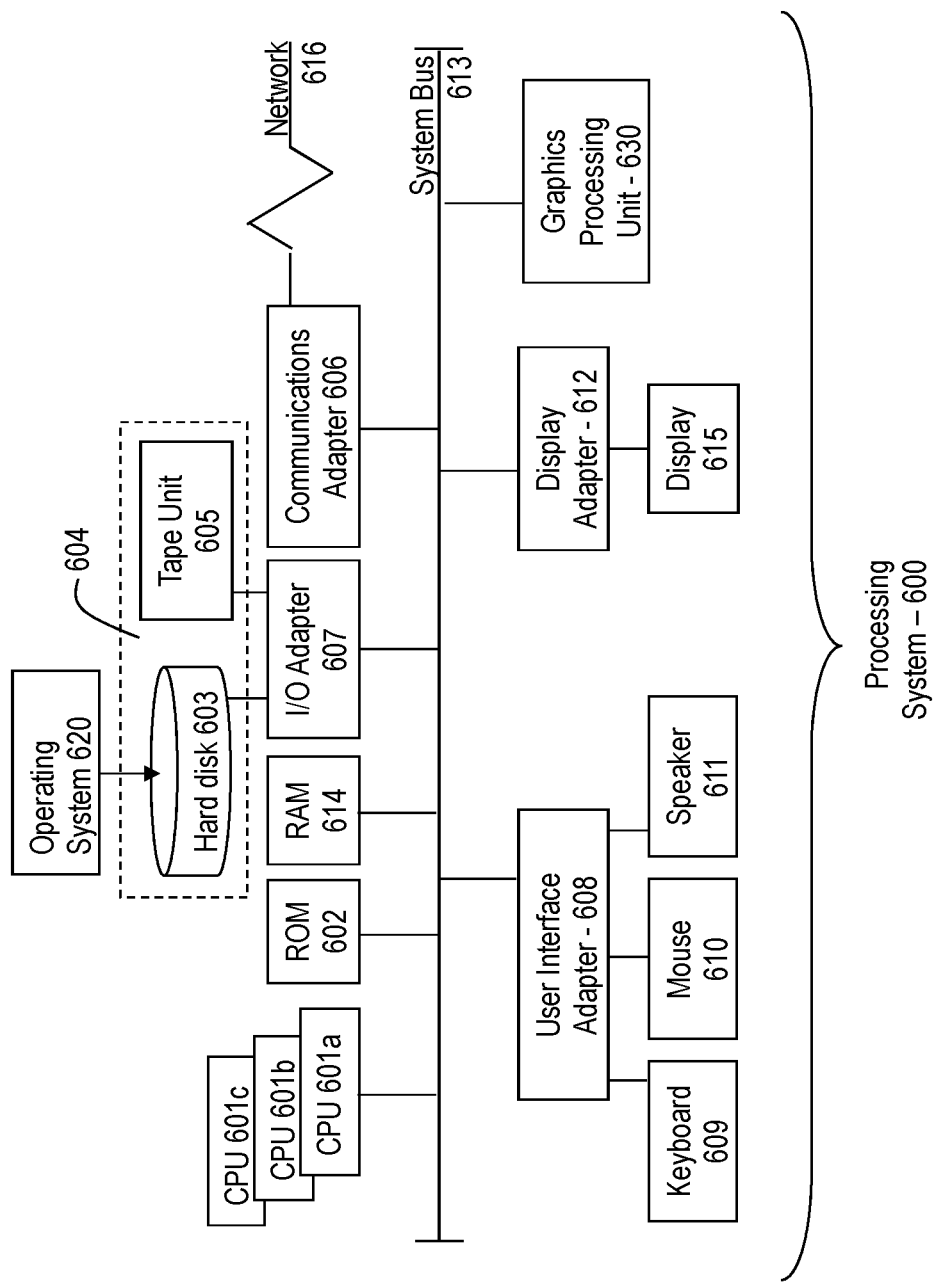
FIG. 6 depicts a processing system for implementing one or more embodiments of the present invention.

Referring to FIG. 6, there is shown an embodiment of a processing system 600 for implementing the teachings herein. In this embodiment, the system 600 has one or more central processing units (processors) 601a, 601b, 601c, etc. (collectively or generically referred to as processor(s) 601). In one embodiment, each processor 601 may include a reduced instruction set computer (RISC) microprocessor. Processors 601 are coupled to system memory 614 and various other components via a system bus 613. Read only memory (ROM) 102 is coupled to the system bus 613 and may include a basic input/output system (BIOS), which controls certain basic functions of system 600.

FIG. 6 further depicts an input/output (I/O) adapter 607 and a network adapter 606 coupled to the system bus 613. I/O adapter 607 may be a small computer system interface (SCSI) adapter that communicates with a hard disk 603 and/or tape storage drive 605 or any other similar component. I/O adapter 607, hard disk 603, and tape storage device 605 are collectively referred to herein as mass storage 604. Operating system 620 for execution on the processing system 600 may be stored in mass storage 604. A network adapter 606 interconnects bus 613 with an outside network 616 enabling data processing system 600 to communicate with other such systems. A screen (e.g., a display monitor) 615 is connected to system bus 613 by display adaptor 612, which may include a graphics adapter to improve the performance of graphics intensive applications and a video controller. In one embodiment, adapters 607, 606, and 612 may be connected to one or more I/O busses that are connected to system bus 613 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 613 via user interface adapter 608 and display adapter 612. A keyboard 609, mouse 610, and speaker 611 all interconnected to bus 613 via user interface adapter 608, which may include, for example, a Super I/O chip integrating multiple device adapters into a single integrated circuit.

In exemplary embodiments, the processing system 600 includes a graphics processing unit 630. Graphics processing unit 630 is a specialized electronic circuit designed to manipulate and alter memory to accelerate the creation of images in a frame buffer intended for output to a display. In general, graphics processing unit 630 is very efficient at manipulating computer graphics and image processing, and has a highly parallel structure that makes it more effective than general-purpose CPUs for algorithms where processing of large blocks of data is done in parallel.

Thus, as configured in FIG. 6, the system 600 includes processing capability in the form of processors 601, storage capability including system memory 614 and mass storage 604, input means such as keyboard 609 and mouse 610, and output capability including speaker 611 and display 615. In one embodiment, a portion of system memory 614 and mass storage 604 collectively store an operating system to coordinate the functions of the various components shown in FIG. 6.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method resolving future reference identifiers for documents, the computer-implemented method comprising:

processing, by a processor, a document comprising a reference to a future event, wherein processing comprises natural language processing (NLP) the document, wherein the future event is at least one of a procedure, test, operation, or check-up associated with a patient;

identifying, by the processor, the reference to the future event included in the document;

generating, by the processor, a future reference identifier for the reference to the future event;

generating, in response to the future event being expected and having not yet occurred, a configurable status indicating that the future event is pending, wherein the configurable status is periodically provided to a user;

processing, by the processor, a subsequent document comprising a second reference to the future event, wherein processing the subsequent document comprises natural language processing the subsequent document to identify text relating to a completion of the future event; and responsive to processing the completion of the future event, resolving, by the processor, the future reference identifier by providing the identified text from the subsequent document for the future event associated with the future reference identifier to the user.

2. The computer-implemented method of claim 1, wherein the subsequent document is a separate and independent document from the document comprising the reference to the future event.

3. The computer-implemented method of claim 2, wherein the subsequent document is asynchronously processed.

4. The computer-implemented method of claim 1, further comprising displaying a list of future reference identifiers for a plurality of events identified in the document.

5. The computer-implemented method of claim 1, further comprising displaying a span of text including the reference to the future reference identifier and displaying the data of the reference associated with the future reference identifier.

6. A system comprising:
   natural language processing (NLP) engine;
   a memory having computer-readable instructions; and
   one or more processors for executing the computer-readable instructions, the computer-readable instructions controlling the one or more processors to perform operations comprising:
   processing a document comprising a reference to a future event, wherein processing comprises natural language processing (NLP) the document, wherein the future event is at least one of a procedure, test, operation, or check-up associated with a patient;
   identifying the reference to the future event included in the document;
   generating a future reference identifier for the reference to the future event;
   generating, in response to the future event being expected and having not yet occurred, a configurable status indicating that the future event is pending, wherein the configurable status is periodically provided to a user;
   processing, by the processor, a subsequent document comprising a second reference to the future event, wherein processing the subsequent document comprises natural language processing the subsequent document to identify text relating to a completion of the future event; and
   responsive to processing the completion of the future event, resolving the future reference identifier by providing the identified text from the subsequent document for the future event associated with the future reference identifier to the user.

7. The system of claim of 6, wherein the subsequent document is a separate and independent document from the document comprising the reference to the future event.

8. The system of claim 7, wherein the subsequent document is asynchronously processed.

9. The system of claim of 6, wherein the one or more processors are configured to display a list of future reference identifiers for a plurality of events identified in the document.

10. The system of claim 6, wherein the one or more processors are configured to display a span of text including the reference to the future reference identifier and display the data of the reference associated with the future reference identifier.

11. A computer program product comprising a computer-readable storage medium having program instructions embodied therewith, the program instructions executable by a processor to cause the processor to perform operations comprising:
    processing a document comprising a reference to a future event, wherein processing comprises natural language processing (NLP) the document, wherein the future event is at least one of a procedure, test, operation, or check-up associated with a patient;
    identifying the reference to the future event included in the document;
    generating a future reference identifier for the reference to the future event;
    generating, in response to the future event being expected and having not yet occurred, a configurable status indicating that the future event is pending, wherein the configurable status is periodically provided to a user;
    processing, by the processor, a subsequent document comprising a second reference to the future event, wherein processing the subsequent document comprises natural language processing the subsequent document to identify text relating to a completion of the future event; and
    responsive to processing the completion of the future event, resolving the future reference identifier by providing the identified text from the subsequent document for the future event associated with the future reference identifier, wherein the subsequent document is a separate and independent document from the document comprising the reference to the future event to the user.

12. The computer program product of claim 11, wherein the subsequent document is asynchronously processed.

13. The computer program product of claim 11, wherein the instructions are further executable by a processor to cause the processor to display a list of future reference identifiers for a plurality of events identified in the document.

14. The computer program product of claim 11, wherein the instructions are further executable by a processor to cause the processor to display a span of text including the reference to the future reference identifier and display the data of the reference associated with the future reference identifier.

* * * * *